United States Patent [19]
Scheffer

[11] 3,995,845
[45] Dec. 7, 1976

[54] ULTRASONIC WIRE BONDING CHUCK

[75] Inventor: Harvey Dow Gibson Scheffer, Westfield, N.J.

[73] Assignee: RCA Corporation, New York, N.Y.

[22] Filed: Dec. 26, 1972

[21] Appl. No.: 318,375

[52] U.S. Cl. .............................. 269/254 CS; 228/1; 228/44.1 A; 269/265; 269/286

[51] Int. Cl.² .................... B23K 1/06; B23K 37/04; H05K 3/32

[58] Field of Search ........... 29/203 J, 203 P, 470.1, 29/470.3, 493, 576 S, 589, 471.1; 228/1, 3.5, 4, 6, 44; 269/40, 152–154, 286, 254, 265; 219/69 M, 69 E

[56] References Cited
UNITED STATES PATENTS

| | | | |
|---|---|---|---|
| 2,416,125 | 2/1947 | Simpson | 219/69 M |
| 2,449,917 | 9/1948 | Tansley | 219/70 |
| 2,685,927 | 8/1954 | Fechter | 269/154 X |
| 3,382,564 | 5/1968 | Gallentine | 228/4 X |
| 3,650,454 | 3/1972 | Coucoulas | 228/1 |
| 3,685,137 | 8/1972 | Gardiner | 29/471.1 X |
| 3,692,225 | 9/1972 | Lincoln | 228/4 |
| 3,698,075 | 10/1972 | Boyle | 29/470.1 |

*Primary Examiner*—Roy Lake
*Assistant Examiner*—Neil Abrams
*Attorney, Agent, or Firm*—Edward J. Norton; William Squire

[57] ABSTRACT

An ultrasonic wire bonding chuck includes first and second jaws for squeezing therebetween and clamping securely thereto said state frames utilized in forming microintegrated circuit solid state devices by ultrasonic bonding techniques. A clamping finger is provided for each lead on the frame secured by the chuck. Additionally the clamping surfaces of both jaws are roughened to provide enhanced gripping action on the member to be clamped and are arranged to substantially eliminate the effects of frame burrs and distortion on the clamping of the frame.

12 Claims, 18 Drawing Figures

ULTRASONIC WIRE BONDING CHUCK

BACKGROUND OF THE INVENTION

The present invention relates to chucks used to secure solid state devices during ultrasonic bonding of interconnecting wires to the devices.

Solid state devices are typically made by stamping a plurality of leads from a sheet of metal, the stamping comprising a so-called frame. Centrally disposed in the frame with respect to the frame leads is a pad on which a semiconductor device is mounted including integrated circuits and the like. These circuits are microminiature and require the bonding of interconnecting wires between the frame leads and the integrated circuit. The frame leads form leads which provide access to conventional external circuitry as known in the microminiature solid state device art.

In the ultrasonic bonding of the interconnecting wires to the frame leads and the integrated circuit mounted on the frame, fixturing is required to firmly secure these leads and the central frame pad including the circuitry mounted thereon during the ultrasonic bonding operation. Since the device frame is stamped from a thin sheet of metal typically about 0.010 inches thick, burrs formed during the stamping operation can be as great in size as the thickness of the material itself. The size and shape of the burrs may differ from frame to frame and from finger to finger as the die which forms the frames wears. In addition to burrs, the stamping operation can cause deformation of certain of the frame leads such that they are nonplanar with the remainder of the frame. In prior art chucks, when securing such frames for ultrasonic bonding, these burrs and distortions of the frame leads has resulted in some of the leads not being securely clamped. When an interconnecting wire is ultrasonically bonded to such a loosely clamped frame lead, the ultrasonic motions have a tendency to vibrate the poorly secured frame lead resulting in a poor ultrasonic bond. In the ultrasonic frame lead bonding industry, long standing attempts to reduce the burrs and distortions or minimize their deleterious effect on ultrasonic bonding have proved to be costly, ineffective and have met with little success.

SUMMARY OF THE INVENTION

In accordance with the present invention, a first clamping jaw comprises a plurality of fingers extending radially inwardly toward each other, the fingers each having a curved clamping face formed of a plurality of microscopic nodules and voids having a given size. A second clamping jaw comprises a planar clamping surface disposed facing the clamping faces of the fingers, the planar surface being formed of microscopic nodules and voids having the given size. Clamping means are coupled to the first and second jaws for urging the jaws to assume either a clamped or unclamped position. A feature of the invention is the provision with the second jaw of a support surface spaced from the planar surface for supporting a portion of the workpiece to be clamped between the jaws, the support surface being formed of a plurality of microscopic nodules and voids having the given size.

DETAILED DESCRIPTION

Figure 6A:
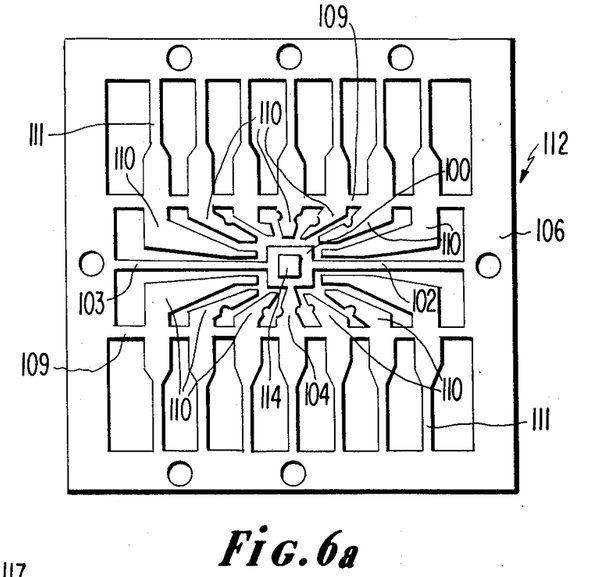
FIG. 6a is a plan view of a typical solid state device lead frame as used in the microminiature integrated circuit art.

Prior to discussing the details of a chuck constructed and operated in accordance with the present invention, a brief description will be given of the frame member to be clamped by this chuck and the constraints of clamping such a member for ultrasonic bonding operations. A typical frame member 112 is shown in FIG. 6a. This member has four alternate arrangements illustrated in FIGS. 6b through 6e, respectively. Member 112 provides the leads which connect a semiconductor microelectric circuit to the outside world such as a socket or the like. Member 112 is a thin sheet metal stamping typically about 0.010 inches thick.

In FIG. 6a, frame member 112 includes an outer frame 106 and a central pad 100 connected to frame 106 by outwardly extending pad 100, support leads 102 and 103 and ground lead 104 which also supports pad 100. Additionally extending radially inwardly from frame 106 is a plurality of leads 110 which are cantilevered as shown adjacent pad 100. Mounted on pad 100 is a microintegrated circuit 114 whose inner circuits are to be selectively ohmically connected to different ones of leads 110. These connections are formed by fine interconnecting wires which are ultrasonically bonded to portions of circuit 114 and selected ones of leads 110 at the cantilvered portions thereof adjacent pad 100. After the interconnecting wires are bonded to leads 110, then in subsequent operations frame 106, leads 102 and 103, the transverse connecting links 109 between leads 110 and 104 and a portion of the narrow link portions 111 are removed and the assembly potted together.

In ultrasonically bonding the interconnecting wires (not shown) to circuit 114 and leads 110 at the cantilevered ends thereof adjacent pad 100, it is clear that both pad 100, circuit 114 and leads 110 need to be firmly secured. In ultrasonic bonding, motions measured in millionths of an inch are introduced at high frequencies. These motions are transferred to the interconnecting wires by the ultrasonic tool. Leads 110 and circuit 114 must not be capable of making these motions during the bonding operation. Otherwise, the motions of the bonding tool will be transferred to the frame 112 at leads 110 and pad 100, as the case may be, and a poor bond will result. In this case, the ultrasonic power is expended by vibrating both the interconnecting wires and the leads 110 or the like instead of the interconnecting wire relative to these leads.

Figure 6B:
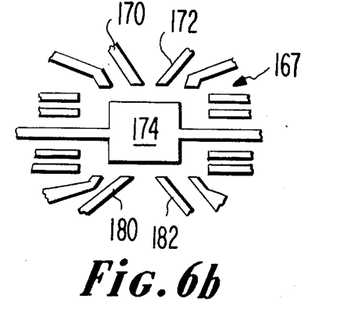
FIGS. 6b through 6e are fragmental plan views of other typical lead frames.
Figure 6C:
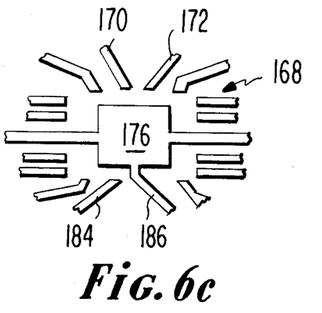
Figure 6D:
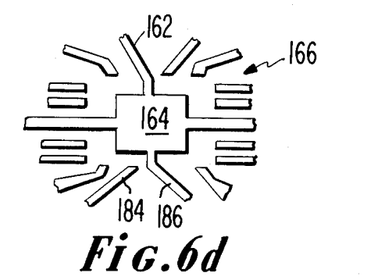

During the manufacturing of member 112, distortions are produced in certain of the leads causing these leads to be non-planar with the remainder of member 112 and burrs of different heights are produced in any or all of these leads such that clamping thereof is difficult with present state of the art clamping apparatus. This is best seen by reference to FIG. 6f showing in phantom burrs 113 or 115 which may depend from the elongated sides of leads 102 to 104 and 110. Burrs 113 and 115 are flattened by a "coining" operation which compresses the burrs as shown in an attempt to minimize the burrs. These burrs may vary in height from lead to lead presenting different clamping thicknesses to prior art chucks among the different leads 110 and 102 through 104. Also shown in phantom is the rolled over distorted condition 117 which is exhibited by those leads 110 adjacent the corners of pad 100. Clamping the leads 110 and 102 through 104 is not unlike clamping a plurality of disks of different thicknesses in parallel between the jaws of a vise. The vise will grip the thickest disk and all other disks will not be secured, and will drop out from between the jaws of the vise. However, not only must the chuck used to clamp member 112 secure leads 110 and 102 through 104, but it must also secure pad 100, while at the same time leaving the cantilevered portions of leads 110 and pad 100 open for the wire bonding operation. The chuck constructed and operated in accordance with the present invention will achieve the above-noted objectives.

In FIGS. 6b through 6e, there is shown alternate arrangements for the frame members such as frame member 112 of FIG. 6a which illustrates different numbers of leads 110, different orientations thereof, and selectively different leads which are connected to the central pad such as pad 100 of frame member 112. Not counting leads 102 and 103 of FIG. 6a which are ultimately severed from frame member 112, there may be either fourteen or sixteen leads of the cantilevered or noncantilevered type such as leads 110 and 104, respectively, in the different configurations of FIGS. 6b through 6e. The chuck of the present invention will clamp all configurations of the frame members of FIGS. 6a through 6e without modification to the chuck.

In the following description reference will be made to both FIGS. 1 and 2a wherein like numerals refer to like parts. Wire bonding chuck 10 includes an outer rectangular housing 12 made of a suitable metal having a cylindrical hollow core 14 extending longitudinally along the length thereof in communication with opposite ends of housing 12. Disposed between core 14 and one side wall of housing 12 is a transverse slot 16 which communicates with end 32 of housing 12. Parallel to slot 16 and disposed between core 14 and the side wall opposite slot 16 is transverse slot 18 which also communicates with end 32 of housing 12. End 32 will hereinafter be referred to as the clamping end of housing 12 and chuck 10. Slots 16 and 18 by way of core 14 form a continuous transverse slot through housing 12.

Closely fitted within core 14 is cylindrical plunger 20. Plunger 20 is made of a suitable metal, has transverse surfaces at opposite ends thereof and slidably translates in the direction of arrow 22 within core 14. Plunger 20 fits within housing 12 along a portion of core 14. Disposed on one transverse surface of plunger 20 is lower clamping jaw 26 of chuck 10 disposed at end 32 of housing 12. Clamping jaw 26 will be described in detail later. In communication with the transverse surface of plunger 20 opposite jaw 26 is transverse slot 40 which forms a continuous transverse slot with slots 16 and 18.

At the clamping jaw end of housing 12 there are four upwardly extending clamping jaw support posts 28 located at each of the four corners of housing 12, as shown. Clamped to the upper surfaces of jaw support posts 28 is upper clamp jaw 30, which is spaced from end 32 in the supported position. Jaw 30 which will be described in greater detail later, is secured across end 32 to posts 28 by suitable fastening means such as screws or the like. End 32 and bottom surface 34 of upper clamp jaw 30 form a recess or slot in which a frame member such as member 112 to be clamped between clamping jaw 30 and clamping jaw 26 is inserted by an operator with a pair of tweezers or the like as seen in FIG. 1.

A compression coil spring 36 is disposed between threaded compression adjustment plug 37 and plunger 20. Threaded plug 37 may be a suitable set screw and is threaded into threaded core 14 at the end of housing 12 opposite end 32 to adjust the compressive load exerted by spring 36 which is preferably about 30 pounds. Spring 36 resiliently urges plunger 20 toward end 32 so that jaw 26 is urged toward jaw 30. This action squeezes frame member 12 (FIG. 1) disposed between the jaws firmly in place as will be described. Threaded into core 14 adjacent plug 37 and extending beyond housing 12 opposite the clamping end, as shown, is threaded chuck mounting plug 38 which serves to mount chuck 10 to a suitable work surface and which is secured to the work surface by screw or bolt 39.

Disposed within slots 40, 16 and 18 is cross arm 44 of actuating lever 42 which is bolted by suitable means to plunger 20. Actuating lever 42 is generally an inverted U-shaped yoke which pulls plunger 20 away from jaw 30 as will be described.

Lever 42 comprises an elongated cross bar 44 and two downwardly extending arms 45 and 46 and two upwardly extending arms 48 and 50. Upwardly extending arms 48 and 50 each include an adjustable stop screw 51 and 53, respectively, which serve to space jaws 26 and 30 from each other when jaws 26 and 30 are in their closed, rest position. The amount of spacing of the jaws preferably about 3 mils, is made less than the thickness of the member 112, about 10 mils, shown in phantom, to be clamped between the jaws 26 and 30. This spacing of the jaws prevents the clamping surfaces of the jaws from burnishing or wearing prematurely the roughened surface finish provided jaws 26 and 30 in a manner to be explained. At the lower ends of downwardly extending arms 45 and 46 are two tranversely extending knife edge members 52 and 54, respectively whose knife edges face upwardly toward end 32.

Pivotally secured to housing 12 is actuating yoke 56 having two yoke arms 58 and 60 and a handle 62. The bottom surface of yoke arms 60 and 58 engage the upwardly facing knife edges of pivot members 52 and 54 as best seen in FIG. 1. When handle 62 is depressed by an operator in the direction of arrow 69 (FIG. 1) yoke arms 58 and 60 cause pivot members 52 and 54 to be downwardly depressed which pulls plunger 20 downwardly toward plug 38 by way of cross bar 44. This permits an operator to insert the member 112 to be clamped between the two clamping jaws 26 and 30. When yoke arm 62 is released, plunger 20 is forced by spring 36 in the opposite direction toward end 32 and jaw 30, squeezing the member inserted between jaws 26 and 30 by the compressive forces of spring 36.

Figure 3:
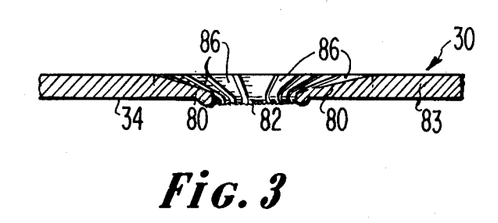
FIG. 3 is a cross sectional side elevational view of the other clamping jaw of the chuck of FIG. 2a including the clamping fingers thereof.
Figure 4:
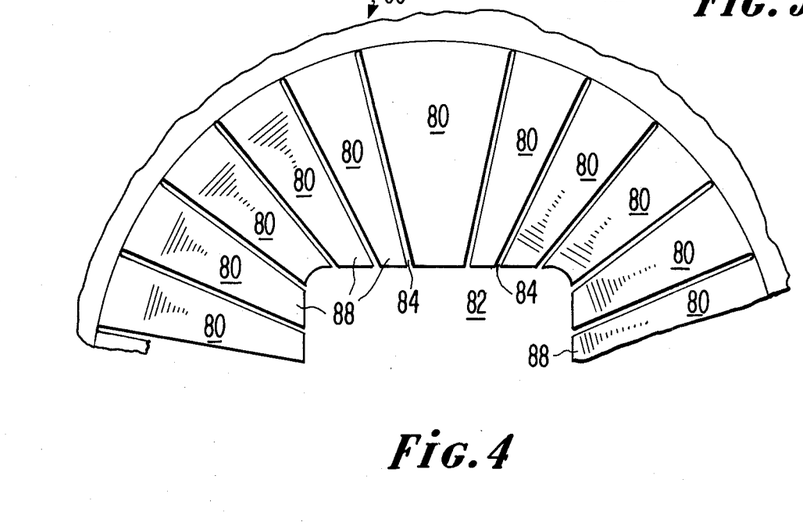
FIG. 4 is an enlarged partial plan view of the clamping jaw of FIG. 3 illustrating the arrangement of the clamping fingers.

Upper clamping jaw 30 will now be described. This description will be accompanied by reference to FIGS. 3, 4 and 5 wherein like numerals refer to like parts. Upper jaw 30 comprises a sheet of rigid material such as metal or the like generally shaped to fit the top of housing 12 as seen in FIG. 1. Centrally formed within jaw 30 are a plurality of radially inwardly extending clamping fingers 80. Fingers 80 are formed from and are integral with the sheet of material 83 forming jaw 30. This may best be seen by an enlarged partial plan view illustrated in FIG. 4. The fingers 80 terminate in a central aperture 82 providing a working area for an operator performing the ultrasonic bonding operations on the material to be bonded disposed within aperture 82.

The shape of aperture 82 is determined in accordance with the configuration of the member 112 to be clamped by this chuck. As shown, this aperture is generally rectangular in accordance with the shape of the frame member 112 typically used in such an arrangement as illustrated in FIG. 6a. Members 80 are formed by cutting radially extending slots 84 in the sheet of material 83 preferably about 5 mils wide. Additionally, the upper surfaces 86 of the fingers are tapered downwardly toward surface 34 at an angle $\alpha$ of preferably about 10° at the horizontal formed by the plane of sheet of material 83.

Figure 5:
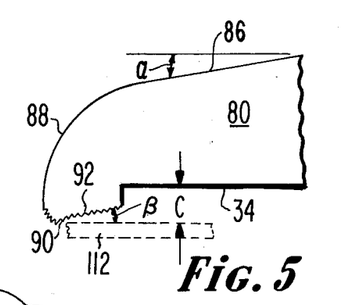
FIG. 5 is a side elevational view of a typical clamping finger of the jaw of FIGS. 3 and 4.

The details of the clamping end of each of fingers 80 is shown in FIG. 5 wherein the innermost edge 88 forming the periphery of aperture 82 is formed into a gradual radius which intersects with curved cylinder-like clamping surfaces 90 formed at the lower surface of fingers 80. Surface 90 extends uniformly in and out of the drawing of FIG. 5. Surface 90 merges with planar surface 92 which slopes upwardly at an angle $\beta$ which forms a clearance area between surface 92 and the member 112 to be clamped by surface 90. Surface 90 provides line contact with the member 112 to be clamped. This provides stress concentration of the clamping surface 90 to the lead of the member to be clamped across the transverse width of that lead providing firm clamping action. Surfaces 90 and 92 depend from lower surface 34 of finger 80 to provide a clearance C between the extended lower surface 34 of finger 80 and the member 112 to be clamped at surface 90.

Clamping surface 90 and clearance surface 92 are preferably formed with a roughened surface such as produced by an electrical discharge machine. In so producing this roughened surface by this method, a plurality of microscopic nodules and voids are formed in surfaces 90 and 92. Preferably; the voids and nodules have a depth in the range of 4 to 25 microinches and a diameter in the range of 1 microinch to 0.7 mils. This range of sizes for the nodules and voids produced by the electrical discharge machining process has been found to provide extremely satisfactory gripping action of the member to be clamped by surface 90. This roughened surface resists motions introduced into the member clamped to the apparatus constructed in accordance with the present invention by a tool vibrating at ultrasonic frequencies during the ultrasonic bonding of the interconnecting wires to the clamped frame or member.

By providing a plurality of clamping fingers 80 as described infra, a separate clamping finger 80 is provided for each of the frame leads, such as leads 110 and 102 through 104, regardless of frame configuration. Fingers 80 are stiffly suspended from the sheet of material 83 so as to provide rigid clamping action against the leads of the various frame members. Each of the frame leads of the various frame members have a separate clamping finger 80 corresponding thereto for clamping that lead independently of the remaining frame leads. Thus, any distortions in any of the frame leads do not substantially affect the clamping action on the remaining leads since each lead is clamped independently of the remaining leads.

Figure 2A:
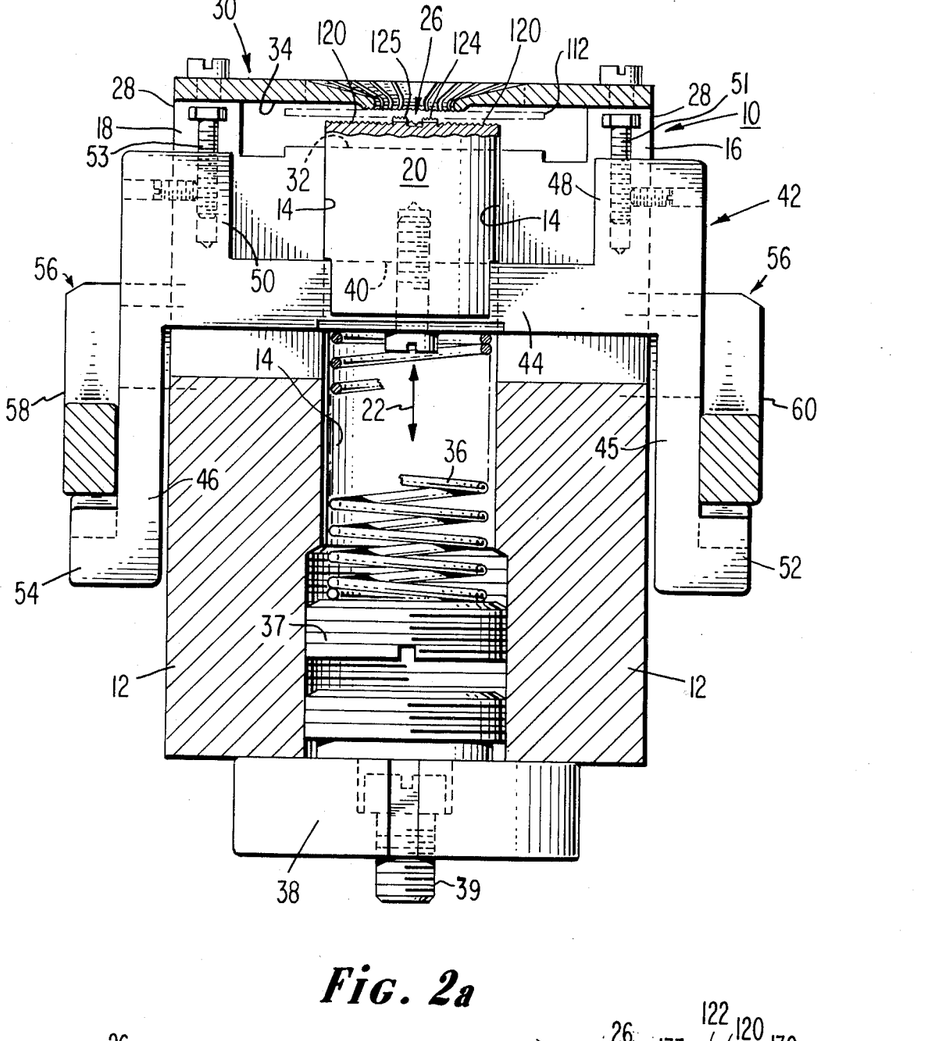
FIG. 2a is a sectional side elevational view of the chuck of FIG. 1 along line 2—2.
Figure 2B:
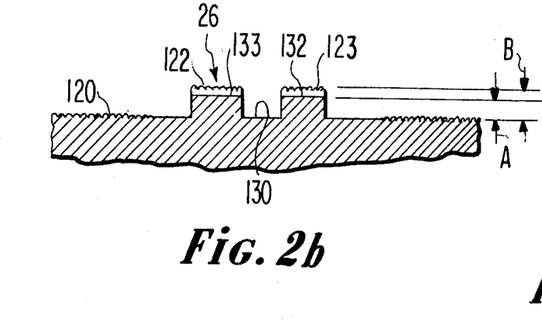
FIG. 2b is an enlarged sectional view of one of the jaws of the chuck of FIG. 2a, FIG. 2c is a perspective view of the jaw of FIG. 2b.
Figure 2C:
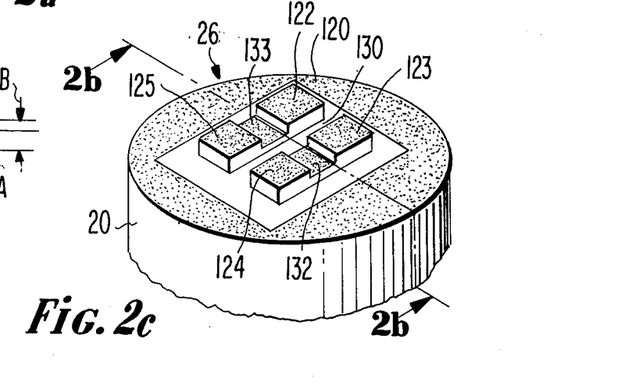
Figure 7:
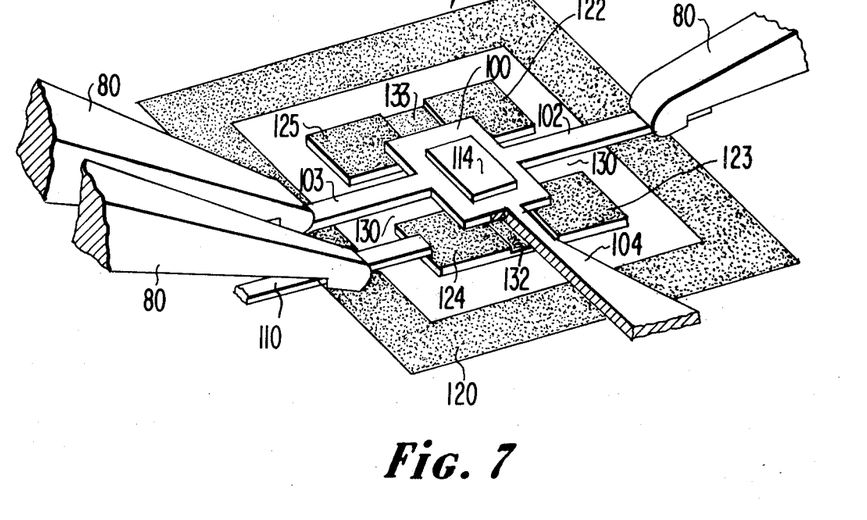
FIG. 7 is a perspective view showing the clamping arrangement of the frame leads to the clamping jaws constructed in accordance with an embodiment of the present invention.

Clamping jaw 26 will now be described with reference to FIGS. 2a, 2b and 2c. Clamping jaw 26 on plunger 20 is shown having a first gripping surface 120 formed by electrical discharge machining. Surface 120 is planar and is arranged on the upper end of plunger 20 in alignment with the gripping surface 90 of each of fingers 80 as best seen in FIG. 7. The microscopic nodules and voids formed in surface 120 by electrical discharge machining have generally the same dimensions noted previously herein. Centrally disposed within the angular ring formed by surface 120 are four frame supporting pads 122 through 125. The four pads 122 through 125 are generally rectangular raised pads extending above surface 120 and have coplanar frame support surfaces parallel to surface 120. Pads 122 and 125 are separated from each other by raised slot 133 and are separated from pads 123 and 124 and raised slot 132 by an elongated channel 130 which is preferably coplanar with surface 120. Pads 122 and 125 and raised slot 133 are formed from one boss member. Slot 133 is normal to channel 130. Preferably pads 122 through 125 are raised a distance B of about 2 mils (FIG. 2b) and the upper surface of slot 133 is raised a distance A of about 1.5 mils above surface 120.

In a similar manner pads 123 and 124 are separated by a raised slot 132 formed in the boss member from which pads 122 and 125 are formed. Slot 132 is normal to channel 130 and forms a continuous transverse slot with slot 133. Slots 132 and 133 are both raised the same distance A above surface 120 while pads 123 and 124 have the same height B above surface 120 as pads 122 and 125.

The upper surfaces of each of pads 122 through 125 and raised slots 132 and 133 are also formed by electrical discharge machining. Microscopic voids and nodules formed in these surfaces by electrical discharge machining provide a gripping surface for central pad 100 of member 112 or the like central pads of the frame configurations of FIGS. 6b through 6e and the ends of leads 110 and 104 of frame 112 and their equivalents in the frames of FIGS. 6b through 6e. The dimensions of the voids and nodules in pads 122 through 125 are the same as noted above for surfaces 90 and 92 of fingers 80.

Figure 1:
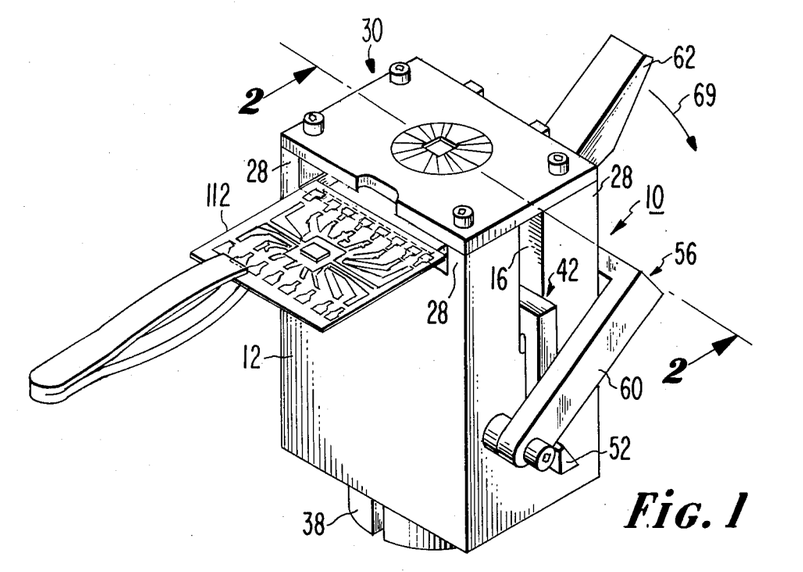
FIG. 1 is a perspective view of an ultrasonic wire bonding chuck constructed in accordance with the present invention.

In operation, an operator takes typical frame member 112, FIG. 6a, with a suitable instrument such as tweezers or the like, as shown in FIG. 1 and inserts the member in the slot formed by clamping jaw 30 and end 32 of housing 12 and pads 122 through 125 on plunger 20, the operator having depressed handle 62 in the direction of arrow 69, pulling plunger 20 downwardly away from jaw 30. When member 112 is inserted between jaws 30 and 26 and aligned with these jaws in a suitable manner by housing 12 so that pad 100 is centrally disposed in aperture 82, FIG. 4, handle 62 is released, spring 36 forces plunger 20 upwardly compressing each of the leads 110 and 102 through 104 of member 112 between the respective clamping jaws 80 and surface 120 on plunger 20.

The transverse width of finger 80 in and out of the drawing of FIG. 5 and the arrangement of fingers 80 on jaw 30 (FIG. 4) is such that regardless which of frame configurations FIGS. 6a through 6e are installed in chuck 10, one finger 80 will be centrally disposed transversely of a corresponding one of the frame leads of that frame then being clamped. With the narrower leads, finger 80 at surface 90 may transversely overlap the width of the corresponding lead while with the wider leads such as lead 104 of FIG. 6a, finger 80 may be centrally disposed within the transverse width boundaries of the lead, with the lead transverse width overlapping the finger 80 transverse width. In any case, each finger 80 is arranged to compressively squeeze the corresponding frame lead between surface 90 of finger 80 and surface 120 of plunger 20 as seen in FIG. 7.

The rounded surface 90 of finger 80 accompanied by the high compressive pressure produced by spring 36 causes surfaces 90 and 120 to penetrate or crush the burrs, e.g., burrs 113 and 115 (FIG. 6f), extending from typical leads such as leads 110 and 102 through 104 and engage the planar surfaces of these leads. Thus, surfaces 90 and 120 contact the corresponding lead across the breadth of surfaces 90 in contact with that lead. This permits firm clamping action of the leads by fingers 80 and surface 120, and provides the further advantage of clamping all of the frame leads of a given frame, e.g., leads 110 and 102 through 104 of frame 112, such that the upper lead surfaces touching surfaces 90 are at the same height above surface 120.

Figure 8:
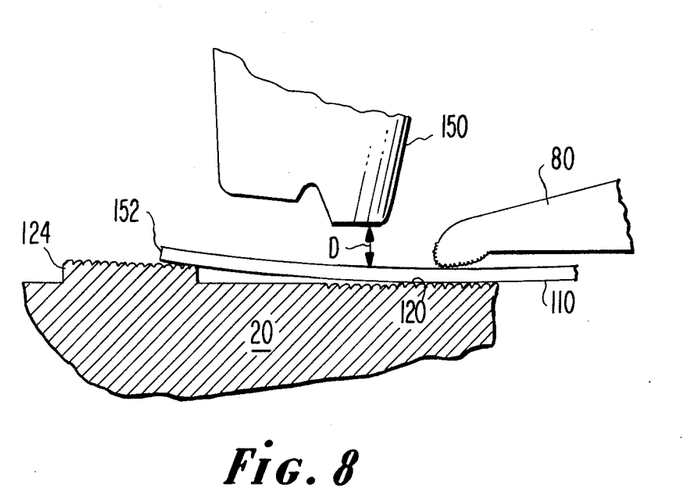
FIG. 8 is a fragmented elevational view of a frame lead clamped between the jaws of the chuck of FIG. 2a and including a bonding tool oriented with respect to the chuck jaws.

This provides a uniform clearance D, FIG. 8, between lead 110, for example, and the lower work surface of the bonding tool 150 for all frame leads in the frame then being clamped. By maintaining clearance D uniform between leads, an operator need not adjust clearance D to be the same for each bond operation on each lead which is necessary in the wire bonding art. Clearance D is known as the so-called search height in this art for tool 150 and is typically about 3 mils. Clearance D must be the same for each bond, otherwise the power and time duration of the ultrasonic power supply used in the bond operation need be adjusted for each different clearance D. These adjustments are slow and inefficient. The uniform clearance D is maintained for all leads in each frame configuration of FIGS. 6b through 6e by a chuck constructed and operated in accordance with the present invention. This substantially increases operator efficiency.

Figure 9:
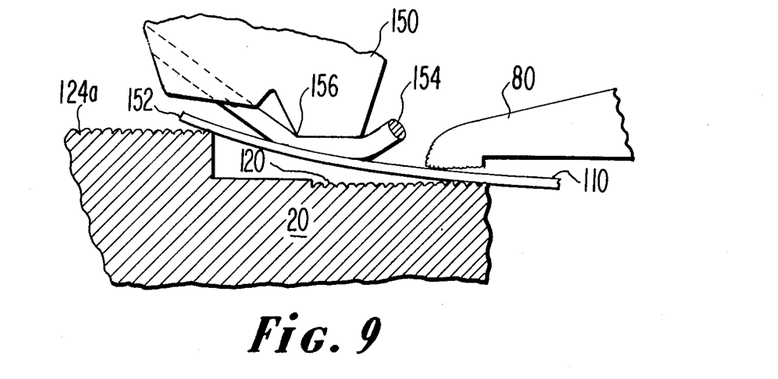
FIG. 9 is a fragmented elevational view of a frame lead clamped between the jaws of the chuck of FIG. 2a with a bonding tool positioned to bond an interconnecting wire useful in describing the present invention.

The purpose of pads 122 through 125 will now be explained. In FIG. 9 typical cantilevered lead 110 (not connected to pad 100, see FIG. 7) is shown clamped between finger 80 and surface 120 at a distance from the lead end 152. The wire bond connection to be made by tool 150 is located between finger 80 and end 152 in clearance aperture 82 (see FIG. 4) of jaw 30. End 152 in prior art chucks could not be firmly secured, vibrated with tool 150, and a poor bond resulted. It has been found that in crushing the burrs 113 and 115 (FIG. 6f) end 152 raises above surface 120 and is free to vibrate. By making pad 124 height B (FIG. 2b) greater than the free height of end 152 when lead 110 is clamped, the clamping action of finger 80 forces end 152 against pad 124 firmly clamping lead 110 to pad 124. However, this height B cannot be made too great as will be explained. The microscopic nodules and voids in the clamping surface of pad 124 further aid in firmly gripping lead 110 at end 152. In a similar manner, all leads 110 are clamped at the ends thereof at the various pads 122 through 125. A height B of about 1.5 mils was found to be satisfactory to secure ends 152 of the frame leads in a chuck actually built and operated in accordance with the present invention.

However, another condition in leads 110 needs to be considered by a frame clamping chuck, and that is the twisted roll over condition 117 of FIG. 6f. In this condition, the plane of the leads is rolled over non-parallel to the rest of the frame member. This condition also causes poor bonds. It has been found that the narrow leads 110 at the corners of pad 100 of each of the frames of FIGS. 6a–6e exhibit this twisted rolled over condition. Pads 122 through 125 serve to also straighten these twisted leads so that they are parallel with surface 120 and thus parallel to the "scrubbing" action of the ultrasonic bonding tool. To correct this twisted condition, height B (FIG. 2b) is made about 2 mils. If height B is made about 1.5 mils, then the twisted condition is not fully eliminated. It should be noted that those leads that may be twisted occur only in overlapping arrangement with pads 122 through 125. Should height B be made greater than 2 mils, e.g., 2.5 mils, then the cutting of interconnecting lead 154 (FIG. 9) occurs at corner 156 of tool 150 due to the angular relationship between leads 110 and the working surface of tool 150.

Slot 130 (FIG. 7) is provided to firmly clamp central pad 100 of frame 112 to pads 122 through 125. Slot 130 is a clearance slot for leads 102 and 103 which are present on all frame configurations in the different frames of FIGS. 6a through 6e. The clamping fingers 80 corresponding to leads 102 and 103 clamp these leads against surface 120. However, since pad 100 is raised above surface 120 by support pads 122 through 125, height B as noted herein above, and leads 102 and 103 are parallel to pad 100, then the finger 80 action tends to force pad 100 downwardly toward the level of surface 120. This downward action forces pad 100 against pads 122 through 125 firmly securing pad 100 thereto. Pads 122 through 125 need be made sufficiently large transversely to provide support for pad 100 and also reach under cantilevered fingers 110 to support ends 152 (FIG. 9) thereof.

Figure 10A:
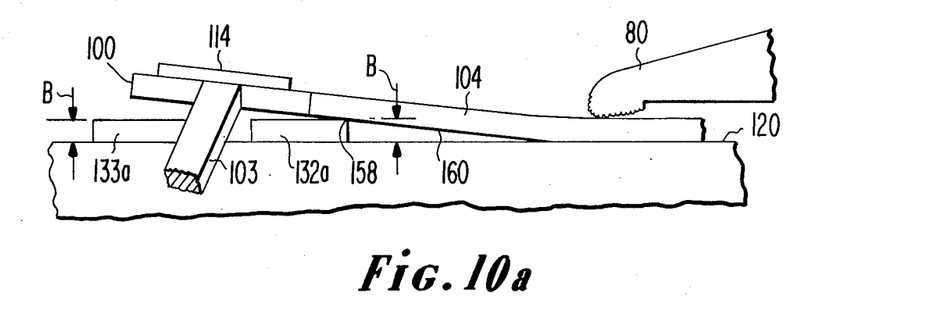
FIGS. 10a and 10b are fragmented elevational views of a clamped frame lead useful in explaining the principles of the present invention.
Figure 10B:
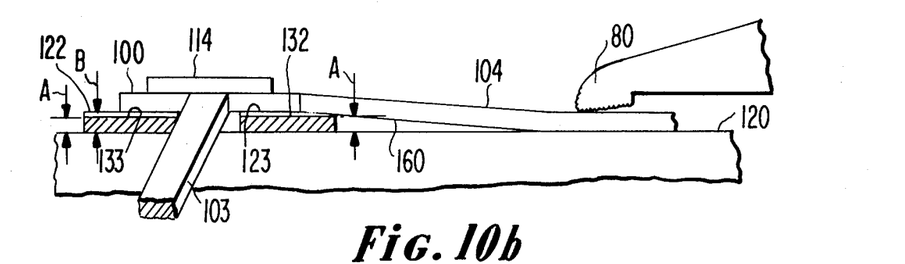

As to slots 132 and 133, these serve several functions. One of these functions is one in which these slots form clearance recesses for those leads such as lead 104, FIG. 7, which are connected to pad 100 transverse to leads 102 and 103. This is best seen in FIGS. 10a and 10b. In FIG. 10a, slots 132 and 133 are omitted and pads 123 and 124 of FIG. 7 are formed into a single pad 132a of height B (FIG. 2b), with pads 122 and 125 being formed into a single pad 133a of height B to show the undesirable effect of this arrangement for frames exhibiting leads connected to pad 100 such as lead 104. As seen in FIG. 10a, lead 104 abuts corner 158 of pad 132a. This raises pad 100 off pads 133a and 132a at a slight angle even with leads 102 and 103 clamped in position against surface 120 (FIG. 7). This raised position of pad 100 permits pad 100 and hence circuit 114, mounted thereon, to vibrate when the interconnecting wires (not shown) are bonded to circuit 114. To overcome this effect, slots 132 and 133 are produced to provide clearance for lower surface 160 of typical lead 104. A slot depth of about 0.5 mils is deemed satsifactory to accomplish this objective, leaving a slot 132 and 133 height A of about 1.5 mils above surface 120 as indicated above.

To illustrate how the differently configured frame leads are received by slots 132 and 133, reference will be made to FIGS. 6b through 6e. In FIG. 6d, slot 133 provides clearance for typical lead 162 connected to central pad 164 of frame member 166. Lead 162 extends from pad 164 in a direction opposite of lead 104 from pad 100 of FIG. 6a.

A second function of slots 132 and 133 in addition to providing clearance for those leads connected to pad 100 is to provide support for the ends of those leads which are cantilevered and which overlap these slots. Such support is given the end of the lead 110 opposite lead 104 and overlapping slot 133, FIG. 6a. Slots 132 and 133 are raised height A above surface 120 to support the ends of the various cantilevered leads which may overlap these slots in the different configurations of the frame members illustrated in FIGS. 6a through 6e in a manner similar to the support provided in lead 110 at end 152, pad 124a, FIG. 9. For this purpose slots 132 and 133 may be less than 2 mils above surface 120 since the leads supported thereby are not twisted. In FIGS. 6b and 6c, frame members 167 and 168, respectively, have two leads 170 and 172, each of which are cantilevered adjacent the respective central frame pads 174 and 176. Leads 170 and 172 tend to overlap slot 133 and be supported thereby in a manner similar to lead 110 overlapping pad 124 of FIG. 7. Slot 133 is made sufficiently wide to receive the full width of both leads 170 and 172 overlapped therewith. Height A of slot 133 is made sufficiently great, e.g., 1.5 mils, to support firmly the ends of leads 170 and 172. Thus while slot 133 provides clearance for lead 162 of FIG. 6d, the raised slot bottom thereof provides support for leads 170 and 172 in the manner described above with respect to leads 110 and pads 122 through 125. In the same manner cantilevered leads 180 and 182 of frame member 167, FIG. 6b, on the side of pad 174 opposite leads 170 and 172 are supported by the raised bottom of slot 132.

In FIGS. 6c and 6d, respective frames 168 and 166 each have a pair of leads 184 and 186, respectively cantilevered and connected to the central pads 176 and 164, as shown. Slot 132 provides both clearance for connected leads 186 and support for the end cantilevered leads 184.

Figure 6E:
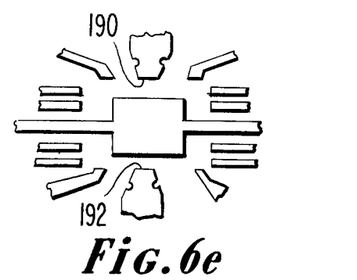
Figure 6F:
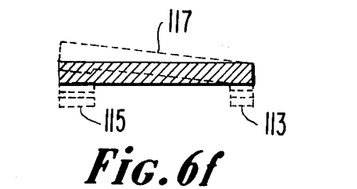
FIG. 6f is a sectional end view of a typical frame lead of the frames of FIGS. 6a through 6e, showing burrs and distortion of the leads.

A still different configuration supported by the bottoms of slots 132 and 133 are the ends of cantilevered leads 190 and 192 of the frame of FIG. 6e which are wider than the various leads 110, 170, 172, 180, 182 and 184 of FIGS. 6a to 6d. In this case, leads 190 and 192 are firmly supported at the ends thereof by the bottoms of slots 133 and 132, respectively, when clamping fingers 80 clamp these leads at the longitudinal midsection thereof to surface 120.

As a result, all leads of the various frame configurations of FIGS. 6a through 6e are firmly supported regardless of burrs, distortions and different orientations and configurations of the various frame members. By making spring 36 of FIG. 2a thirty pounds or more in compressive load, the frame member central pads and leads are secured to withstand ultrasonic vibrations in both the longitudinal direction along any lead as well as in transverse direction across any lead in accordance with the orientation of the bonding tool to the frame then being operated upon. This is accomplished by the jaws 26 and 30 which substantially eliminate the effects of any distortion in the frame member caused by deformation of the leads, burrs or other manufacturing defects that may be present therein.

Thus, in accordance with the present invention, there has been shown apparatus for clamping solid state devices between a plurality of radially inwardly extending clamping jaw fingers and a planar second jaw surface each of which have a roughened surface for gripping the clamped members disposed therebetween. This roughened surface is preferably formed by electrical discharge machining the clamping surfaces which provides a plurality of microscopic gripping voids and nodules and almost point contact on the gripping fingers 80. These nodules being microscopic exert high unit pressure on the metal of the leads of the frame member. This high unit pressure causes these nodules to sink into the metal of the various leads being clamped providing an extremely firm grip on the member being clamped.

What is claimed is:

1. A clamp for securing a device including a plurality of finger-like leads extending radially outwardly from a central pad and radially inwardly from an annular frame terminating adjacent said central pad, said clamp securing said device during ultrasonic bonding of interconnecting wires to said leads comprising:
    first and second clamping jaws for clamping said fingers therebetween,
    means coupled to said jaws for causing said jaws to assume a clamp and unclamp position,
    said first jaw having a clamping surface formed of a plurality of finger gripping microscopic nodules and voids, said nodules and voids being the microstructure of said clamping surface when said surface is formed by an electrical discharge machining process,
    said second jaw including an annular array of finger-like jaws extending radially inwardly toward each other, said finger-like jaws each having a clamping surface disposed facing said first jaw clamping surface, said finger-like jaws clamping surfaces being formed of a plurality of said microscopic nodules and voids, each finger-like jaw corresponding to a different one of said leads for clamping that corresponding lead to said first jaw, said clamping surface gripping each said lead independently of the other leads and substantially eliminating slippage of any of said leads during said bonding.

2. A clamp for securing a microcircuit frame device including a plurality of finger-like leads extending radially outwardly from a central pad and radially inwardly from an annular frame terminating adjacent said central pad, said clamp securing said device during ultrasonic bonding of interconnecting wires to said leads comprising:
- a first planar clamping jaw mounted on said clamp, a second clamping jaw mounted on said clamp comprising a plurality of radially inwardly extending fingers each having a curved clamping face disposed facing said planar clamping jaw,
- a plurality of pad and lead support members mounted on said clamp between said first and second clamping jaws for supporting solely the ends of those leads extending radially inwardly and said pad a given distance spaced from the plane of said first clamping jaw, said pads being disposed in spaced relationship for receiving said outwardly extending leads therebetween, and
- means mounted on said clamp for urging said first and second jaws toward each other in a device clamping position to secure said device by way of said leads.

3. The clamp of claim 2 wherein a first portion of said support members is disposed a given first distance from said first jaw.

4. The clamp of claim 3 wherein a second portion of said support members is disposed a given second distance from said first jaw said second distance being different from said first distance.

5. A clamp for securing a device including a plurality of finger-like leads extending radially outwardly from a central pad and radially inwardly from an annular frame terminating adjacent said central pad, said clamp securing said device during ultrasonic bonding of interconnecting wires to said leads comprising:
- first and second clamping jaws for clamping said fingers therebetween,
- means coupled to said jaws for causing said jaws to assume a clamp and unclamp position,
- said first jaw having a clamping surface formed of a plurality of finger gripping microscopic nodules and voids having a given size,
- said second jaw including an annular array of finger-like jaws extending radially inwardly toward each other, said finger-like jaws each having a clamping surface disposed facing said first jaw clamping surface, said finger-like jaws clamping surfaces being formed of a plurality of microscopic nodules and voids of said given size, each finger-like jaw corresponding to a different one of said leads for clamping that corresponding lead to said first jaw, said clamping surfaces gripping each said lead independently of other leads and substantially eliminating slippage of any of said leads during said bonding, and
- a plurality of spaced pad supporting members extending from said first jaw clamping surface toward said second jaw a given distance, the space between said members defining a plurality of slits each slit corresponding to a different one of said leads extending from said central pad.

6. The clamp of claim 5 wherein said supporting surface is formed of a plurality of microscopic nodules and voids having said given size.

7. The clamp of claim 5 wherein one of said slits extends in a first direction, said first slit having a bottom wall defined by said first jaw clamping surface, a second of said slits extending transversely said first direction and having a bottom wall spaced from said first jaw clamping surface a given distance.

8. The clamp of claim 5 wherein said members extend from the plane of said first jaw surface a distance of about 2 mils.

9. The clamp of claim 7 wherein said second slit bottom wall is spaced from the plane of said first jaw surface a distance of about 1.5 mils.

10. A clamp for securing a microcircuit planar frame of the type having a plurality of finger-like leads extending radially outwardly from a central pad and radially inwardly from an annular periphery terminating adjacent said central pad, said clamp securing said device during the bonding of interconnecting wires to said leads comprising:
- a first clamping jaw comprising a plurality of clamping fingers extending radially inwardly toward each other, said fingers each having a clamping face,
- each clamping face being disposed in said jaw in alignment with a separate different corresponding one of said leads,
- a second clamping jaw comprising a planar clamping surface disposed facing the clamping faces of said fingers for clamping said leads therebetween, said second clamping jaw including means for supporting said central pad and the ends of said inwardly extending leads at a position spaced from the plane of said second clamping jaw to thereby resiliently secure to said second jaw said lead ends by bending said inwardly extending leads during said clamping, and
- means coupled to said first and second clamping jaws for urging said jaws to assume either a clamp or unclamp position.

11. A clamp for securing a microcircuit planar frame of the type having a plurality of finger-like leads extending radially outwardly from a central pad and radially inwardly from an annular periphery terminating adjacent said central pad, said clamp securing said device during the bonding of interconnecting wires to said leads comprising:
- a first clamping jaw comprising a plurality of clamping fingers extending radially inwardly toward each other, said fingers each having a clamping face,
- each clamping face being disposed in said jaw in alignment with a separate different corresponding one of said leads,
- a second clamping jaw comprising a planar clamping surface disposed facing the clamping faces of said fingers for clamping said leads therebetween, said second clamping jaw including means for supporting said central pad and the ends of said inwardly extending leads at a position spaced from the plane of said second clamping jaw to thereby resiliently secure to said second jaw said lead ends by bending said inwardly extending leads during said clamping,
- said second clamping jaw supporting means comprising a plurality of raised pads disposed on said planar clamping surface and defining a plurality of slits therebetween, said slits receiving corresponding ones of said outwardly extending leads, said pads supporting said inwardly extending leads, and
- means coupled to said first and second clamping jaws for urging said jaws to assume either a clamp or unclamp position.

12. The clamp of claim 11 wherein each clamping finger corresponds to a separate, different lead in said frame.

* * * * *